(12) United States Patent
Creta et al.

(10) Patent No.: US 6,681,292 B2
(45) Date of Patent: Jan. 20, 2004

(54) DISTRIBUTED READ AND WRITE CACHING IMPLEMENTATION FOR OPTIMIZED INPUT/OUTPUT APPLICATIONS

(75) Inventors: Kenneth C. Creta, Gig Harbor, WA (US); Mike Bell, Beaverton, OR (US); Robert George, Austin, TX (US); Bradford B Congdon, Olympia, WA (US); Robert Blankenship, Tacoma, WA (US); Duane January, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 09/940,835

(22) Filed: Aug. 27, 2001

(65) Prior Publication Data

US 2003/0041212 A1 Feb. 27, 2003

(51) Int. Cl.[7] .............................................. G06F 13/00
(52) U.S. Cl. ........................ 711/119; 711/141; 711/145; 711/146; 709/217
(58) Field of Search ................................ 711/119, 120, 711/141, 145, 146, 118, 122; 709/217, 220

(56) References Cited

U.S. PATENT DOCUMENTS

| 5,613,153 | A | | 3/1997 | Arimilli et al. | |
|---|---|---|---|---|---|
| 5,835,945 | A | * | 11/1998 | King et al. | 711/120 |
| 6,128,711 | A | | 10/2000 | Duncan et al. | |
| 6,192,450 | B1 | * | 2/2001 | Bauman et al. | 711/135 |
| 6,230,219 | B1 | | 5/2001 | Fields, Jr. et al. | |
| 6,321,298 | B1 | * | 11/2001 | Hubis | 711/124 |
| 6,434,639 | B1 | * | 8/2002 | Haghighi | 710/39 |
| 6,463,510 | B1 | * | 10/2002 | Jones et al. | 711/138 |
| 2001/0032299 | A1 | * | 10/2001 | Teramoto | 711/141 |
| 2003/0041215 | A1 | * | 2/2003 | George et al. | 711/141 |

OTHER PUBLICATIONS

Patent Application Publication No. US 2001/0014925 A1, dated Aug. 16, 2001, Kumata.

* cited by examiner

*Primary Examiner*—Hong Kim
(74) *Attorney, Agent, or Firm*—Pillsbury Winthrop LLP

(57) ABSTRACT

A caching input/output hub includes a host interface to connect with a host. At least one input/output interface is provided to connect with an input/output device. A write cache manages memory writes initiated by the input/output device. At least one read cache, separate from the write cache, provides a low-latency copy of data that is most likely to be used. The at least one read cache is in communication with the write cache. A cache directory is also provided to track cache lines in the write cache and the at least one read cache. The cache directory is in communication with the write cache and the at least one read cache.

30 Claims, 6 Drawing Sheets

DISTRIBUTED READ AND WRITE CACHING IMPLEMENTATION FOR OPTIMIZED INPUT/OUTPUT APPLICATIONS

BACKGROUND OF THE INVENTION

1. Field of the Invention

The present invention generally relates to a caching input/output (I/O) hub. More particularly, the present invention relates to a distributed read and write caching implementation within a caching I/O hub that optimizes scalability and performance in multi-processor computer systems.

2. Discussion of the Related Art

Multi-processor computer systems are designed to accommodate a number of central processing units (CPUs), coupled via a common system bus or switch to a memory and a number of external input/output devices. The purpose of providing multiple central processing units is to increase the performance of operations by sharing tasks between the processors. Such an arrangement allows the computer to simultaneously support a number of different applications while supporting I/O components that are, for example, communicating over a network and displaying images on attached display devices. Multi-processor computer systems are typically utilized for enterprise and network server systems.

To enhance performance, all of the devices coupled to the bus must communicate efficiently. Idle cycles on the system bus represent time periods in which an application is not being supported, and therefore represent reduced performance.

A number of situations arise in multi-processor computer system designs in which the bus, although not idle, is not being used efficiently by the processors coupled to the bus. Some of these situations arise due to the differing nature of the devices that are coupled to the bus. For example, central processing units typically include cache logic for temporary storage of data from the memory. A coherency protocol is implemented to ensure that each central processor unit only retrieves the most up to date version of data from the cache. In other words, cache coherency is the synchronization of data in a plurality of caches such that reading a memory location via any cache will return the most recent data written to that location via any other cache. Therefore, central processing units are commonly referred to as "cacheable" devices.

However, input/output components are generally non-cacheable devices. That is, they typically do not implement the same cache coherency protocol that is used by the CPUs. Accordingly, measures must be taken to ensure that I/O components only retrieve valid data for their operations. Typically, I/O components retrieve data from memory, or a cacheable device, via a Direct Memory Access (DMA) operation. An input/output hub component may be provided as a connection point between various input/output bridge components, to which input/output components are attached, and ultimately to the central processing units.

An input/output hub may be a caching I/O hub. That is, the I/O hub includes a caching resource to hold read and write elements. Although a single caching resource may be utilized for both read and write elements, the read and write elements are treated differently by the I/O components and the interfaces connected thereto, and accordingly have different requirements. Because the single caching resource is utilized by both read and write elements, the caching resource is not optimized for either application, and accordingly, it is not the most efficient implementation available.

DETAILED DESCRIPTION

Figure 1A:
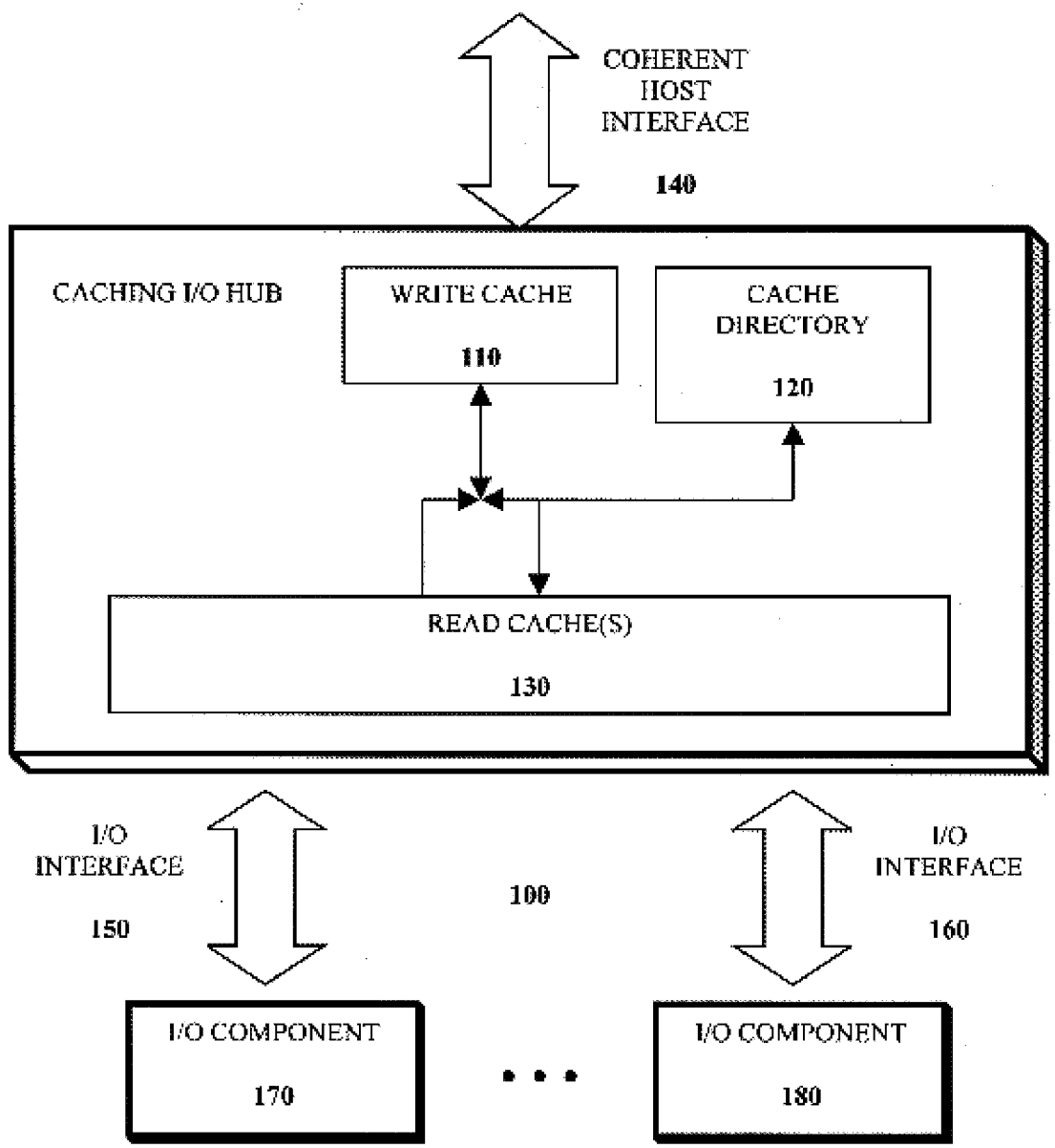
FIG. 1A illustrates an input/output read and write caching system according to an embodiment of the present invention.

FIG. 1A illustrates an input/output read and write caching system according to an embodiment of the present invention. The caching input/output hub 100 according to an embodiment of the present invention implements coherency and is particularly optimized for input/output applications where: (1) writes from I/O components or devices tend not to be read without another agent's modification; (2) I/O devices tend to read from different locations (buffers) in the main memory; and (3) I/O devices might "break up" long transactions into smaller, contiguous transactions (for both reads and writes). For example, the caching input/output hub may be implemented on a chipset, such as the Intel 870 chipset. I/O components or devices 170, 180, may be, for example, Peripheral Component Interconnect (PCI) ("PCI Local Bus Specification", Revision 2.1, Jun. 1, 1995, from the PCI Special Interest Group (PCI-SIG)) bridges. However, any other suitable device may be utilized as I/O components or devices 170, 180.

The caching I/O hub 100 includes a write cache 110, a cache directory 120, and one or more read caches 130. A coherent host interface 140, such as a front-side bus or an Intel Scalability Port, is provided to connect with a coherent host, such as Scalability Node Controller in conjunction with the processor units. The Scalability Port, for example, is a cache-coherent interface optimized for scalable multi-node systems that maintain coherency between all processors and their caches. According to one embodiment of the present invention, the coherent host interface 140 may connect with two coherent hosts, such as two Scalability Ports. At least one input/output interface 150, 160 is provided to connect with the I/O components or devices 170, 180. In one embodiment of the present invention, the I/O interface 150, 160 may not directly connect to the I/O components or devices 170, 180, though. An intermediary device, such as a hub-link or input/output bridge, like an Intel P64H2 Hub Interface-to-PCI Bridge, or a VXB Infini-Band ("InfiniBand Architecture Specification", version 1.0, Jun. 19, 2001, from the InfiniBand Trade Association) Bridge, may be connected to the I/O interface 150, 160 (according to one embodiment), to which the I/O components or devices 170, 180 connects. Each P64H2 bridge, for example, has two PCI-X ("PCI-X Specification", Revision 1.0a, Aug. 29, 2000, from the PCI-SIG) segments to which I/O components or devices 170, 180 may connect. PCI-X is a high-performance extension to the PCI Local Bus having increased bandwidth and bus performance.

Rather than employing a single caching resource, the caching I/O hub 100 according to an embodiment of the present invention divides the caching resource into smaller, more implementable portions, which includes a write cache 110, one or more read cache(s) 130, and a cache directory 120 to track all of these elements. An advantage to separating the write cache 110 from the read cache(s) 130 is that the read cache(s) 130 may be sized independently of the write cache 110. According to an embodiment of the present invention, the write cache 110 is driven by the number of outstanding writes required to achieve full throughput on the coherent host interface 140. Full throughput is a function of the frequency, width, and efficiency of the coherent host interface 140. On the other hand, the read cache depth is driven by the amount of data prefetching required to achieve full I/O bandwidth. The two depths from the write cache 110 and the read cache 130 are not necessarily dependent upon the same factors. Therefore, keeping these two resources 110, 130 separate is valuable by allowing an efficient implementation targeting a particular application for each resource 110, 130.

Data cached in the read cache(s) 130 is preferably located as close to the I/O interface 150, 160 as possible. This approach minimizes the latency for "cache hits" and performance is increased. A cache hit is a request to read from memory that may be satisfied from the cache without using the main memory. This arrangement is particularly useful for data that is prefetched by the I/O component or device 170, 180. On the other hand, "snoops" that are issued by (i.e., monitored by) the coherent host must be satisfied quickly as well, especially those for I/O caching where the majority of snoops are likely to "miss" the I/O caching resources. Therefore, it is preferable to implement a separate cache directory 120 that resides as close to the coherent host and the coherent host interface 140 as possible.

Because writes to memory are typically not read without some modification by another agent first, it is preferable to implement write caching for an I/O bridge as more of a write-combining buffer, as compared to a processor cache, where writes are often soon read (temporal locality). Accordingly, separating the read cache(s) 130 and the write cache 110 results in a coherent buffer storing recently read data near the I/O components or devices 170, 180, a cache directory near the coherent host for quick responses therewith, and a "lean" write cache 110 optimized for input/output applications.

In particular, the write cache 110 manages coherent memory writes initiated by the I/O components 170, 180. The write cache 110 is also responsible for snooping, or monitoring, the coherent host interface 140 before committing to the memory write. According to an embodiment of the present invention, the write cache 110 follows the Modified-Exclusive-Shared-Invalid (MESI) caching protocol. However, any suitable caching protocol may be utilized. In a particular embodiment of the present invention, the write cache 110 maintains cache lines in the modified, exclusive, and invalid states. Cache lines are the smallest unit of memory that may be transferred between the main memory, usually a dynamic random access memory (DRAM), and the cache.

Figure 1B:
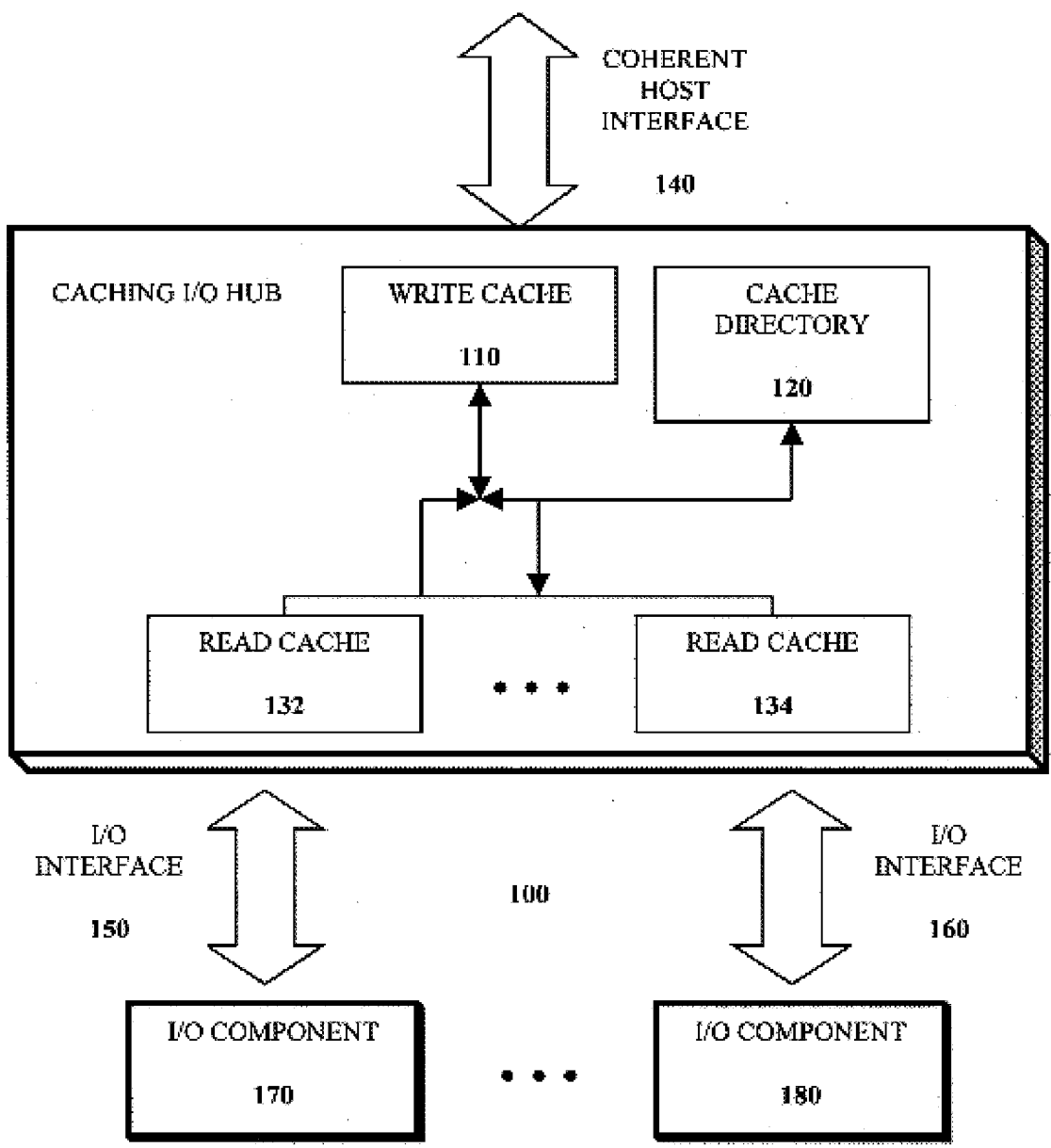
FIG. 1B illustrates an input/output read and write caching system according to an alternative embodiment of the present invention.

One or more read cache(s) 130 are provided in the caching input/output hub 100 according to an embodiment of the present invention. In one embodiment of the present invention, a common read cache 130 may be provided across all of the I/O interfaces 150, 160 and I/O components 170, 180. In an alternative embodiment of the present invention as illustrated in FIG. 1B, a first read cache 132 may be provided and associated with the first I/O interface 150, and a second read cache 134 may be provided and associated with the second I/O interface 160. That is, for each I/O interface 150, 160, there is a read cache 132, 134 dedicated thereto. Any suitable configuration of the number of I/O interfaces, I/O components, and read caches may be utilized. The read cache(s) 130 provides the I/O component 170, 180 a low latency copy of the "most likely to use" data. According to an embodiment of the present invention, the read cache(s) 130, 132, 134 maintain cache lines in the shared and invalid states. Although the read caches 130, 132, 134 are illustrated in FIGS. 1 and 2 as being on a single component (i.e., on the caching I/O hub 100), the read caches may be distributed and separated on one or more different components.

A cache directory 120 is provided in the caching I/O hub 100 according to an embodiment of the present invention. The cache directory 120 provides tracking of all of the cache lines in the write cache 110 and the read cache(s) 130. The cache directory 120 tracks the line state, as well as a pointer to the structure that stores the tracked data. Tracking the state enables a faster response to requests. Tracking the structures storing the line enables the protocol that is required between the structures.

The caching I/O hub 100 may have a plurality of caching resources, each including a write cache 110, a cache directory 120, and one or more read cache(s) 130. Moreover, the caching I/O hub 100 may include a coherency engine interconnecting the read cache(s) 130 and the write cache 110. The coherency engine is utilized to synchronize the caches within the caching resource(s).

Figure 2A:
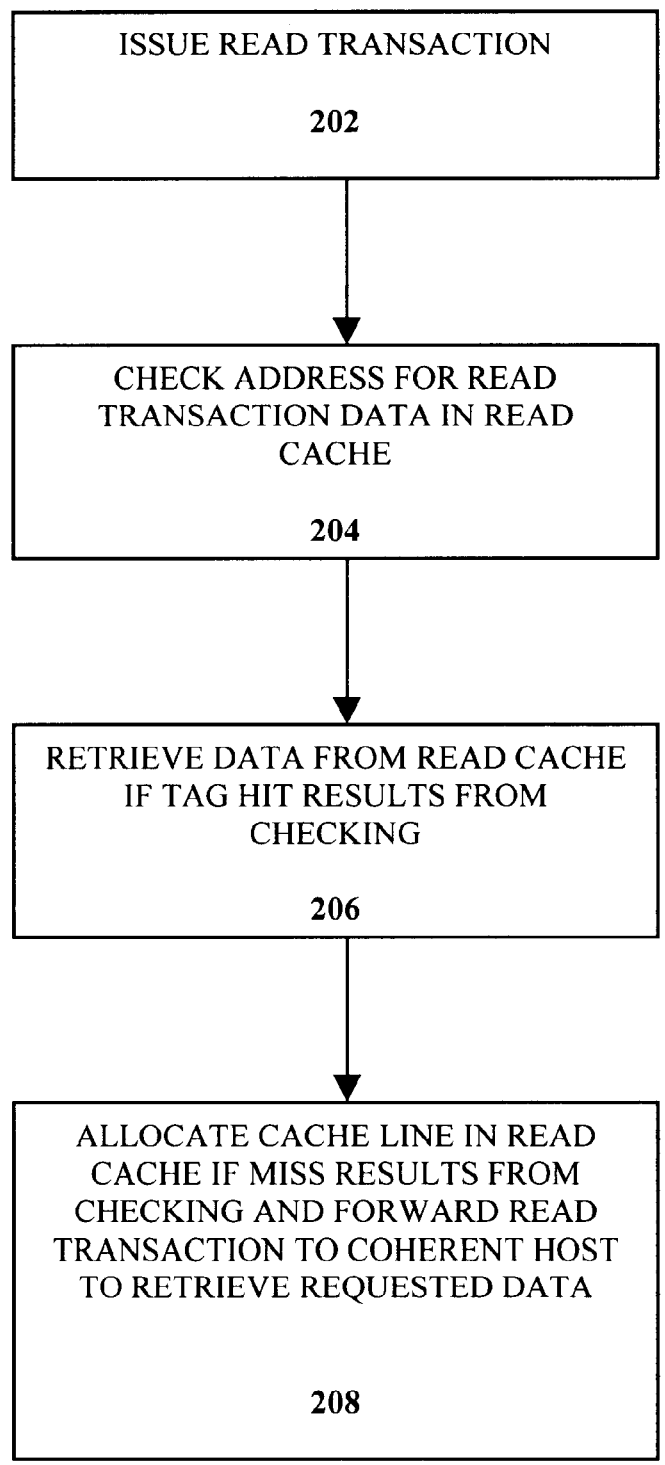
FIG. 2A illustrates an inbound coherent read transaction according to an embodiment of the present invention.

FIG. 2A illustrates an inbound coherent read transaction according to an embodiment of the present invention. An inbound coherent read originates from the I/O interface 150, 160 (ultimately from the I/O component 170, 180) to the caching I/O hub 100. Accordingly, a read transaction is issued 202. The address for the read transaction is checked 204 in the read cache 130, 132, 134. If the check results in a "tag hit", then the request read data is returned 206 by the read cache and a completion packet for the pending read request is sent. If the read cache 130, 132, 134 check results in a "miss", a cache line in the read cache is allocated 208, and the read transaction is forwarded 208 to the coherent host 140 to retrieve the requested read data in the coherent memory space, typically in the main memory.

Figure 2B:
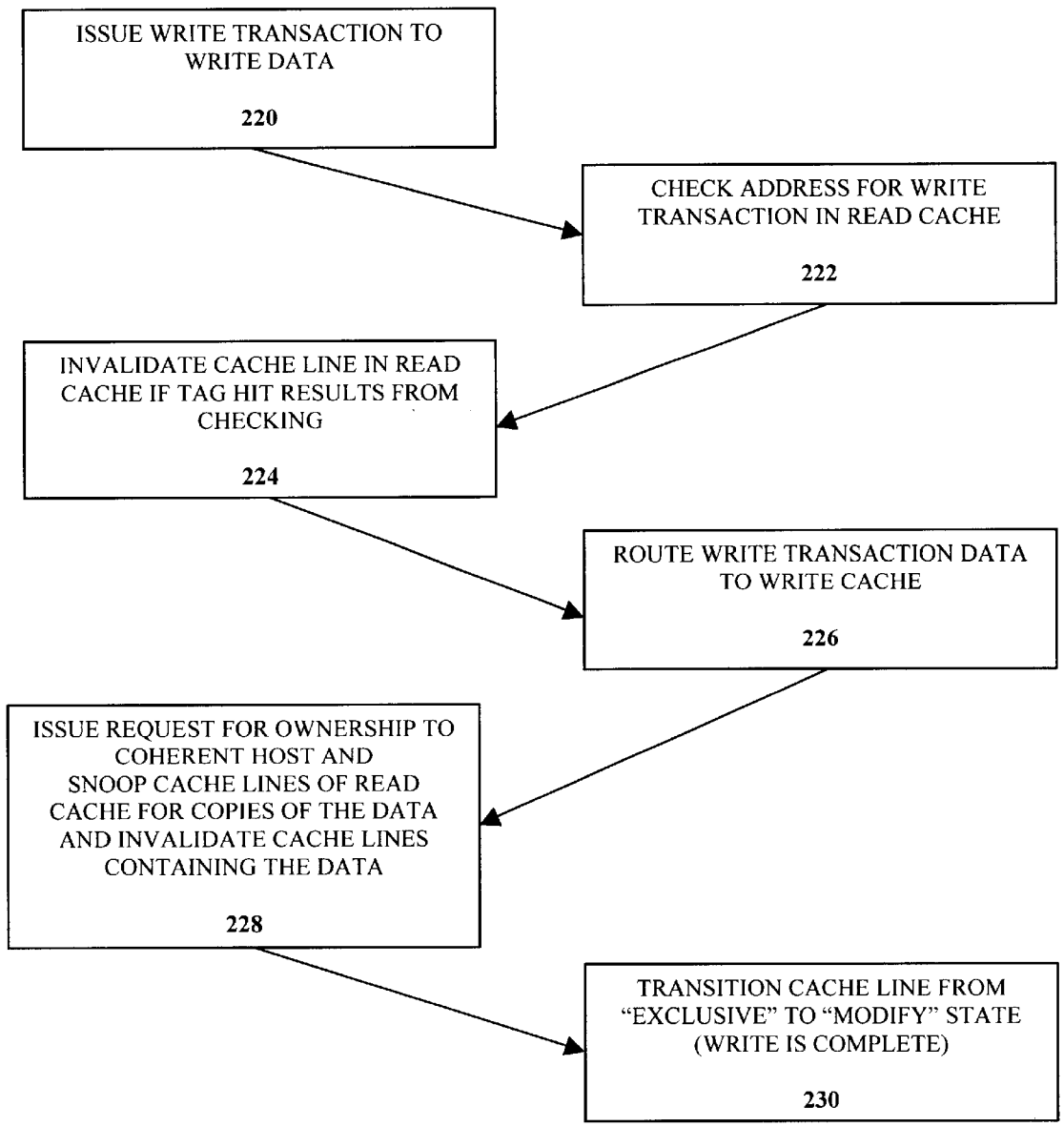
FIG. 2B illustrates an inbound coherent write transaction according to an embodiment of the present invention.

FIG. 2B illustrates an inbound coherent write transaction according to an embodiment of the present invention. An inbound coherent write originates from the I/O interface 150, 160 (ultimately from the I/O component 170, 180) to the caching I/O hub 100. Accordingly, a write transaction to write data is issued 220. The address for the write transaction is checked 222 in the read cache 130, 132, 134. If the check results in a "tag hit", that cache line in the read cache 130, 132, 134 is invalidated 224. The data is routed 226 to a write cache 110. A request for ownership is issued 228 to the coherent host. The cache lines of the read cache(s) 130, 132, 134 are snooped 230 for copies of the data, and the cache lines containing the data are invalidated 228. Once the request for ownership completes, and the read cache lines are invalidated 228, the write cache line is transitioned 230 from the "exclusive" state to the "modified" state. The write transaction is now complete, and the updated data is available to the rest of the system.

Figure 2C:
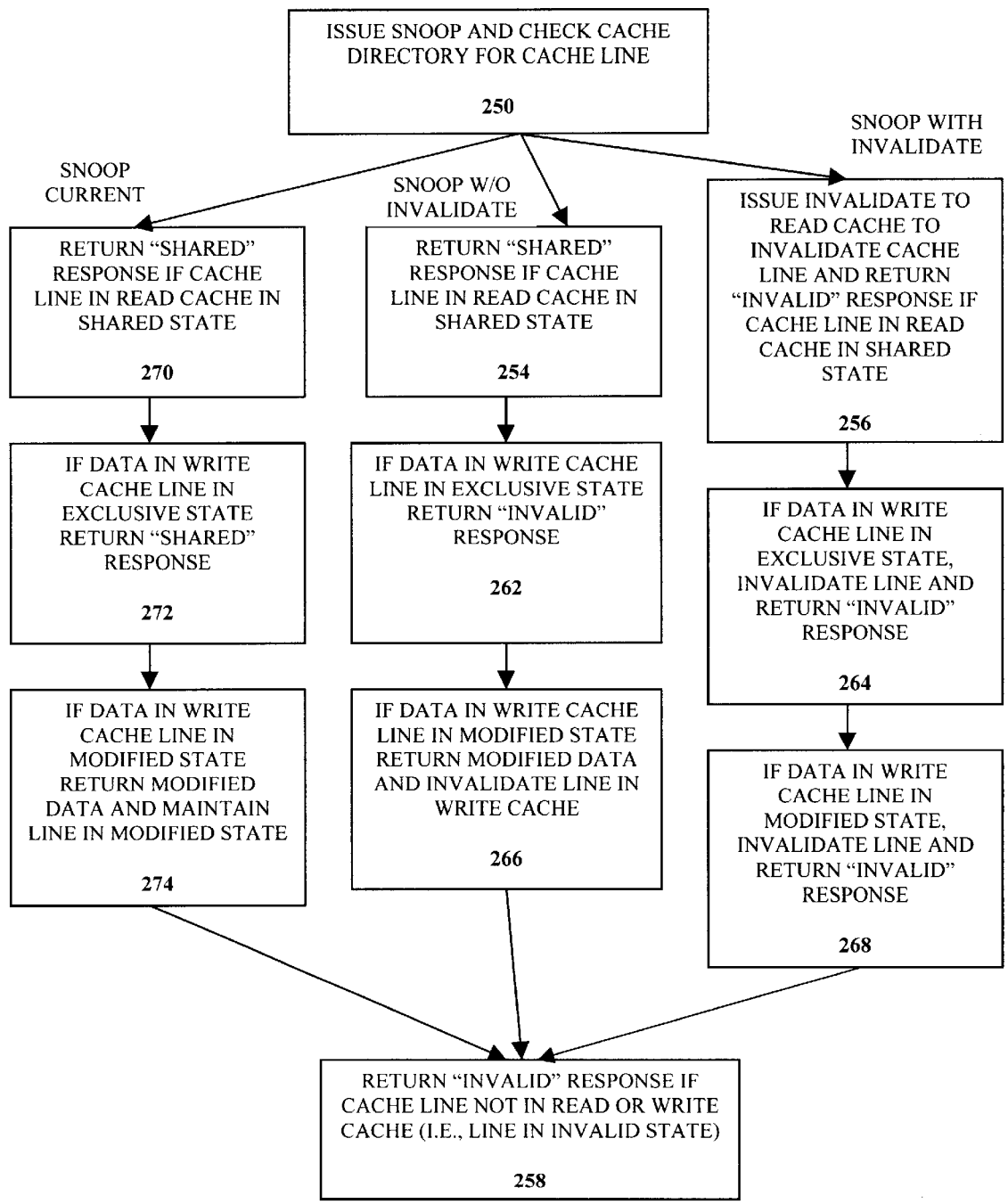
FIG. 2C illustrates snoop operations from the coherent host according to an embodiment of the present invention.

FIG. 2C illustrates snoop operations from the coherent host according to an embodiment of the present invention. Since the I/O hub 100 is a caching agent participating in the central snoop architecture, the coherent host components frequently send snoop cycles to the I/O hub 100. According to an embodiment of the present invention, there are two main types of snoops from the coherent host: (1) a snoop without invalidate (a subset of which is a "snoop current"); and (2) a snoop with invalidate (snoop invalid). For both snoop types, they are issued 250 from the coherent host, which the I/O hub 100 receives. The cache directory 120 is checked 250 for a particular requested cache line.

For the snoop without invalidate (and the snoop current), if the cache line is determined by the cache directory 120 to be in the read cache 130 in the shared state, then a "shared" response is returned 254, 270, i.e., informing the coherent host that it is in the shared state. If the cache line is determined to be in the write cache 110 being in an exclusive state, then an "invalid" response is returned 262 and the line is invalidated in the write cache 110 (and a line request is reissued). However, if a snoop current is utilized and the cache line is determined to be in the write cache 110 being in an exclusive state, then a "shared" response is returned 272 and the line remains in the write cache 110 in the exclusive state. If the cache line is determined to be in the write cache 110 being in a modified state, then the modified data is returned 266 and the write cache line is invalidated. However, if a snoop current is utilized and the cache line is determined to be in the write cache 110 being in a modified state, then the modified data is returned 274, but the write cache line is maintained in the modified state.

For the snoop with invalidate, if the cache line is determined by the cache directory 120 to be in the read cache 130, then an "invalidate" command is issued 256 to the read cache 130 to invalidate the cache line, and an "invalid" response is returned 256. That is, the cache directory 120 invalidates the cache line and sends an invalidate command to the appropriate read cache(s) 130. If a hit occurred to multiple read caches, the cache directory 120 sends an invalidate to all the appropriate read caches 130. If the cache line is determined to be in the write cache 110 being in an exclusive state, then the cache line is invalidated 264 and an "invalid" response is returned. The I/O hub 100 may then reissue a partial write or a full line write command in order to refetch the "stolen" line. If the cache line is determined to be in the write cache 110 being in a modified state, then the cache line is invalidated 268 and an "invalid" response is returned. The I/O hub 100 may return "dirty data" to the snooping agent with an implicit write-back. For both types of snoops, if the cache line is not located in the write cache 110 or the read cache 130 (i.e., the line is in an invalid state), then an "invalid" response is returned 258—indicating that the I/O hub 100 does not have the requested cache line.

Figure 3:
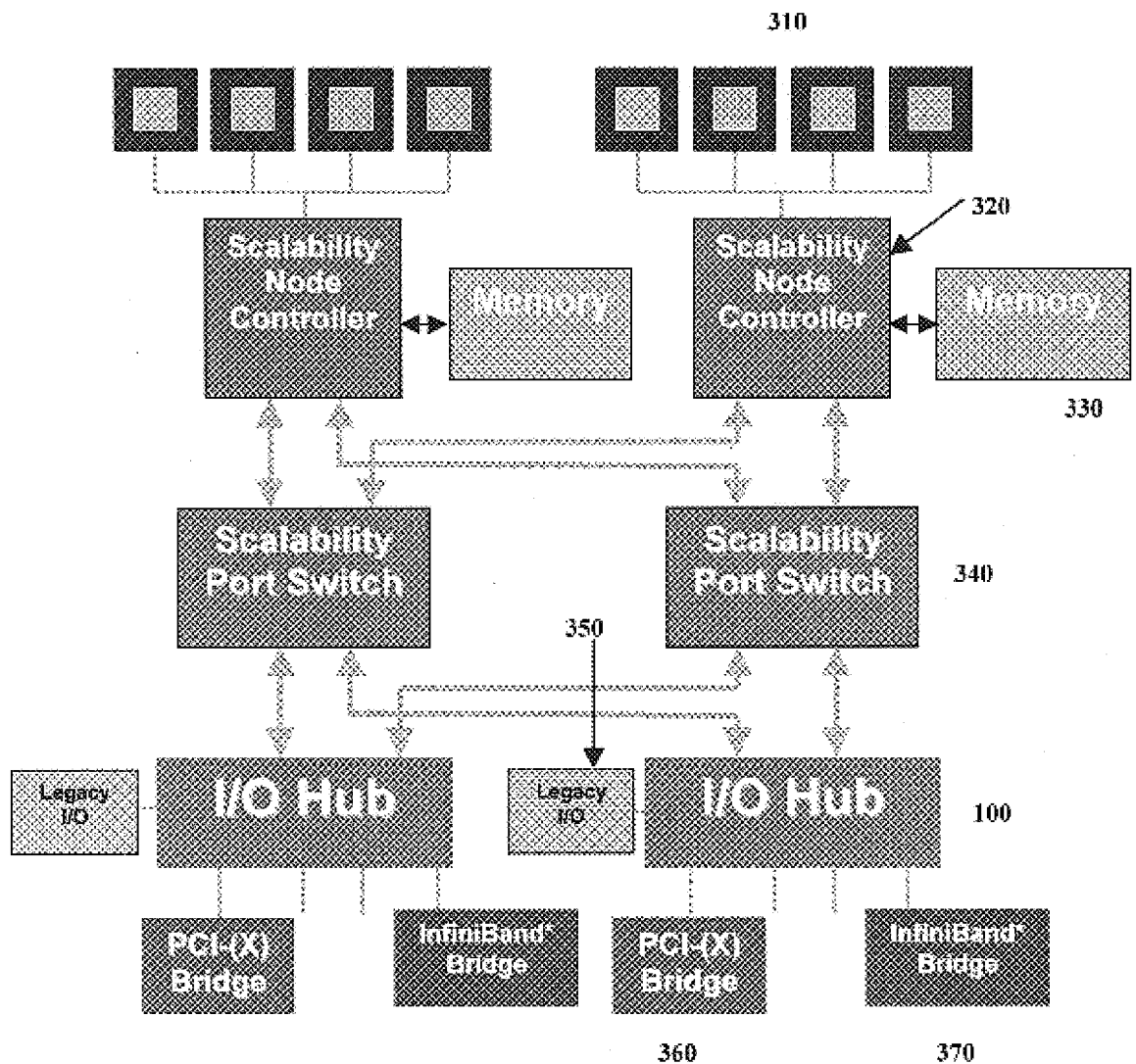
FIG. 3 illustrates an input/output system architecture according to an embodiment of the present invention.

FIG. 3 illustrates an input/output system architecture according to an embodiment of the present invention. As discussed above, the caching I/O hub 100 may include input/output interfaces 150, 160 that are coupled to an intermediary device, such as a hub-link or input/output bridge, like a PCI-X bridge 360 or an InfiniBand bridge 370. The I/O components or devices 170, 180 then connect to the intermediary devices 360, 370. The caching I/O hub 100 may also include an I/O interface that connects to a legacy input/output bridge 350 to handle connections with legacy I/O components or devices.

The caching I/O hub 100 is adapted to connect to a coherent host, such as a Scalability Port 340, which is a cache-coherent interface optimized for scalable multi-node systems that maintain coherency between all processors and their caches. The Scalability Port 340 in turn may connect to at least one Scalability Node Controller 320, which controls the interface between the processors 310, the main memory 330 (e.g., DRAM), and the Scalability Port 340.

Accordingly, the caching I/O hub 100 utilized in the I/O system architecture 300 of the present invention provides for optimized I/O applications in, for example, a chipset for a multi-processor computer system. The caching I/O hub 100 minimizes latency and provides quick responses to requests. Implementation scalability and performance are therefore optimized with the caching I/O hub 100 of the present invention.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A caching input/output hub, comprising:
   a host interface to connect with a host;
   at least one input/output interface to connect with an input/output device;
   a write cache to manage memory writes initiated by the input/output device;
   at least one read cache, separate from the write cache, to provide a low-latency copy of data that is most likely to be used, wherein the at least one read cache is in communication with the write cache; and
   a cache directory to track cache lines in the write cache and the at least one read cache, wherein the cache directory is in communication with the write cache and the at least one read cache.

2. The input/output hub according to claim 1, wherein the at least one read cache is located closer to the input/output interface than the write cache and the cache directory.

3. The input/output hub according to claim 1, wherein the cache directory is located closer to the host interface than the at least one read cache.

4. The input/output hub according to claim 1, wherein the write cache further snoops the host interface prior to committing to the memory writes.

5. The input/output hub according to claim 1, wherein the input/output device is a Peripheral Component Interconnect (PCI) device.

6. The input/output hub according to claim 1, wherein the write cache utilizes a Modified-Exclusive-Shared-Invalid (MESI) caching protocol.

7. A caching input/output system, comprising:
   a host interface to connect with a host;
   at least one input/output interface;
   at least one input/output device connected with the input/output interface;
   a write cache to manage memory writes initiated by the input/output device;
   at least one read cache, separate from the write cache, to provide a low-latency copy of data that is most likely to be used, wherein the at least one read cache is in communication with the write cache; and
   a cache directory to track cache lines in the write cache and the at least one read cache, wherein the cache directory is in communication with the write cache and the at least one read cache.

8. The input/output system according to claim 7, wherein the at least one read cache is located closer to the input/output interface than the write cache and the cache directory.

9. The input/output system according to claim 7, wherein the cache directory is located closer to the host interface than the at least one read cache.

10. The input/output system according to claim 7, wherein the write cache further snoops the host interface prior to committing to the memory writes.

11. The input/output system according to claim 7, wherein the at least one input/output device is a Peripheral Component Interconnect (PCI) device.

12. The input/output system according to claim 7, wherein the write cache utilizes a Modified-Exclusive-Shared-Invalid (MESI) caching protocol.

13. A caching input/output system, comprising:
a coherent host interface;
a coherent host connected with the coherent host interface;
a first input/output interface;
a second input/output interface;
a first input/output device connected with the first input/output interface;
a second input/output device connected with the second input/output interface;
a write cache to manage coherent memory writes initiated by at least one of the first input/output device and the second input/output device;
at least one read cache, separate from the write cache, to provide a low-latency copy of data that is most likely to be used, wherein the at least one read cache is in communication with the write cache; and
a cache directory to track cache lines in the write cache and the at least one read cache, wherein the cache directory is in communication with the write cache and the at least one read cache.

14. The input/output system according to claim 13, wherein the at least one read cache is located closer to the first input/output interface and the second input/output interface than the write cache and the cache directory.

15. The input/output system according to claim 13, wherein the cache directory is located closer to the host interface than the at least one read cache.

16. The input/output system according to claim 13, wherein the write cache further snoops the coherent host interface prior to committing to the coherent memory writes.

17. The input/output system according to claim 13, wherein the first input/output device is a Peripheral Component Interconnect (PCI) device.

18. The input/output system according to claim 13, wherein the second input/output device is a Peripheral Component Interconnect (PCI) device.

19. The input/output system according to claim 13, wherein the write cache utilizes a Modified-Exclusive-Shared-Invalid (MESI) caching protocol.

20. A caching input/output system, comprising:
a coherent host interface;
a coherent host connected with the coherent host interface;
a first input/output interface;
a second input/output interface;
a first input/output device connected with the first input/output interface;
a second input/output device connected with the second input/output interface;
a write cache to manage coherent memory writes initiated by at least one of the first input/output device and the second input/output device;
a first read cache separate from the write cache and associated with the first input/output interface;
a second read cache separate from the write cache and associated with the second input/output interface, wherein the first read cache and the second read cache provide a low-latency copy of data that is most likely to be used, and the first read cache and the second read cache are in communication with the write cache; and
a cache directory to track cache lines in the write cache, the first read cache, and the second read cache, wherein the cache directory is in communication with the write cache, the first read cache, and the second read cache.

21. The input/output system according to claim 20, wherein the first read cache and the second read cache are located closer to the first input/output interface and the second input/output interface than the write cache and the cache directory.

22. The input/output system according to claim 20, wherein the cache directory is located closer to the host interface than the first read cache and the second read cache.

23. The input/output system according to claim 20, wherein the write cache further snoops the coherent host interface prior to committing to the coherent memory writes.

24. The input/output system according to claim 20, wherein the first input/output device is a Peripheral Component Interconnect (PCI) device.

25. The input/output system according to claim 20, wherein the second input/output device is a Peripheral Component Interconnect (PCI) device.

26. The input/output system according to claim 20, wherein the write cache utilizes a Modified-Exclusive-Shared-Invalid (MESI) caching protocol.

27. A computer system, comprising:
a plurality of processor units;
a main memory;
a coherent interface to maintain coherency between the processor units and their caches;
a scalability node controller interconnecting the processor units, the main memory, and the coherent interface to control interface therebetween; and
a caching input/output hub in communication with the coherent interface, including:
a host interface to connect with the coherent interface;
at least one input/output interface to connect with an input/output device;
a write cache to manage memory writes initiated by the input/output device;
at least one read cache, separate from the write cache, to provide a low-latency copy of data that is most likely to be used, wherein the at least one read cache is in communication with the write cache; and
a cache directory to track cache lines in the write cache and the at least one read cache, wherein the cache directory is in communication with the write cache and the at least one read cache.

28. The computer system according to claim 27, wherein the at least one read cache is located closer to the input/output interface than the write cache and the cache directory.

29. The computer system according to claim 27, wherein the cache directory is located closer to the host interface than the at least one read cache.

30. The computer system according to claim 27, wherein the write cache further snoops the host interface prior to committing to the memory writes.

* * * * *